Figure 5:
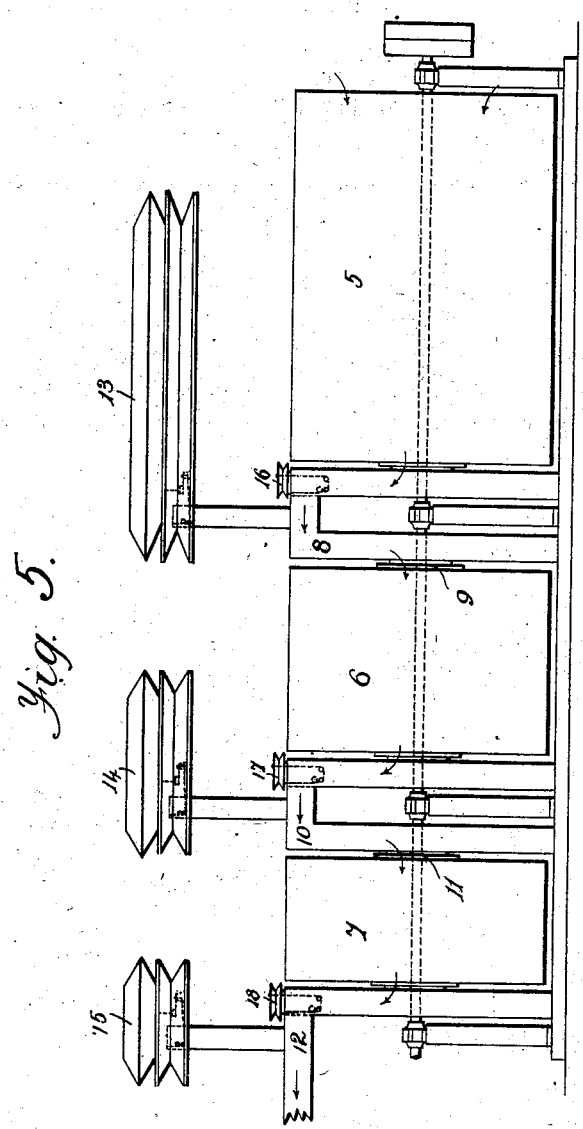

No. 726,263. PATENTED APR. 28, 1903.
H. DAVIS.
APPARATUS FOR DELIVERING AIR UNDER PRESSURE.
APPLICATION FILED APR. 8, 1902.
NO MODEL. 3 SHEETS—SHEET 1.
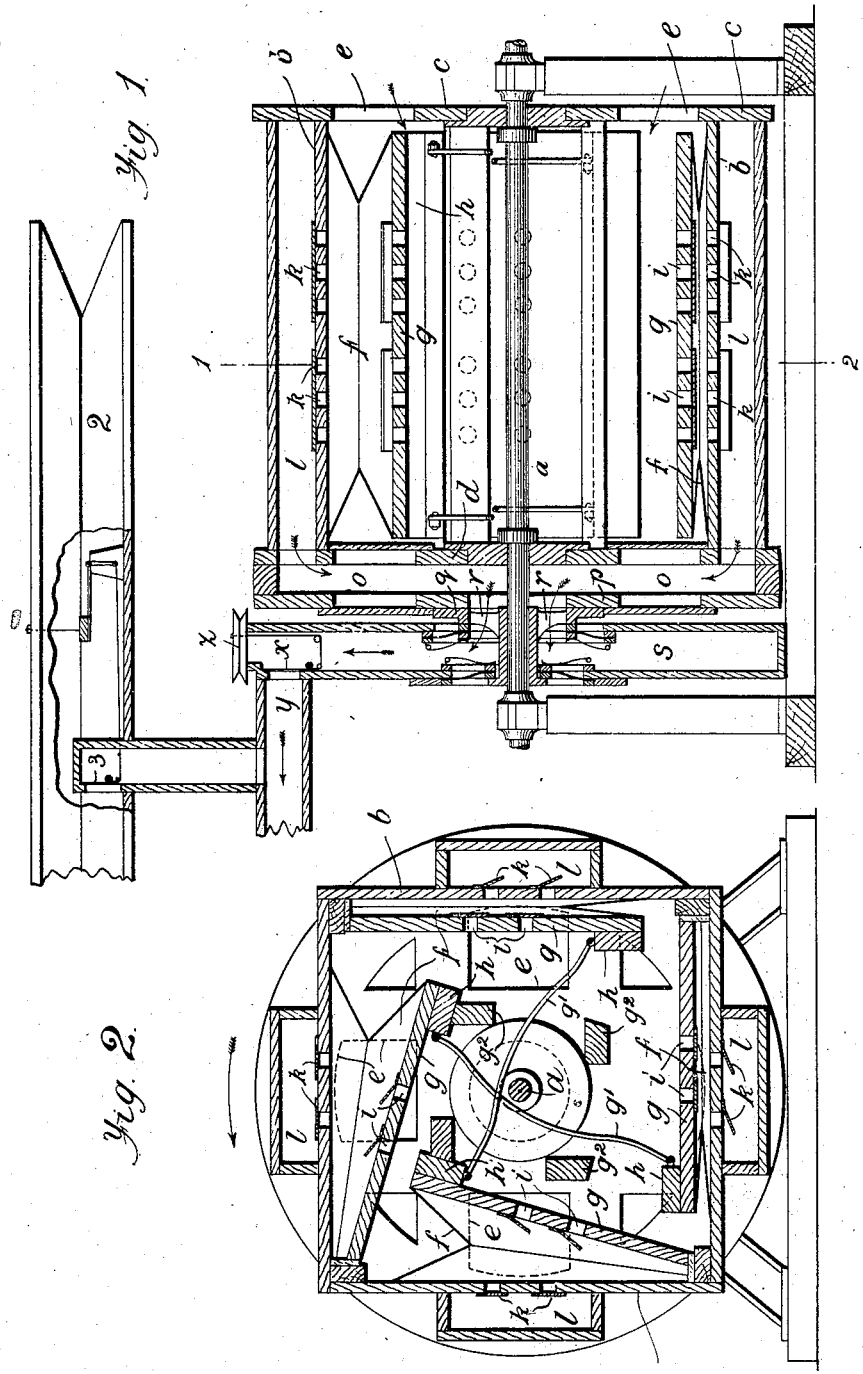
WITNESSES:
Fred White
Thomas H. Wallace
INVENTOR:
Herbert Davis,
By his Attorneys No. 726,263. PATENTED APR. 28, 1903.
H. DAVIS.
APPARATUS FOR DELIVERING AIR UNDER PRESSURE.
APPLICATION FILED APR. 8, 1902.
NO MODEL. 3 SHEETS—SHEET 2.
Fig. 3.
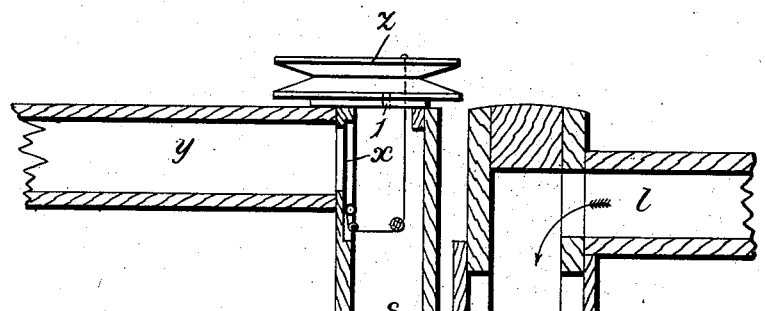
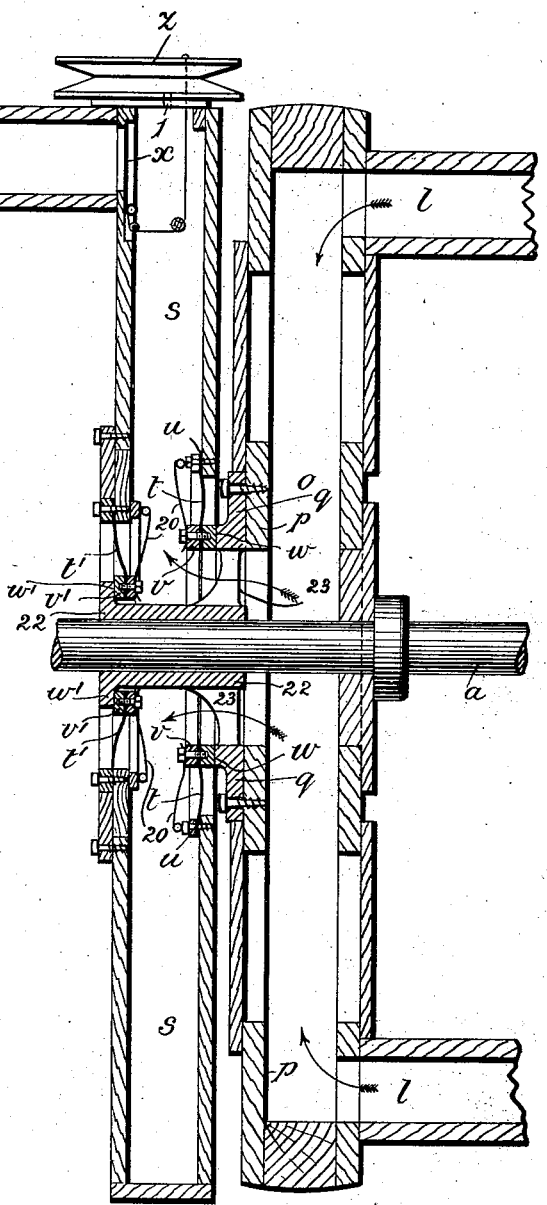
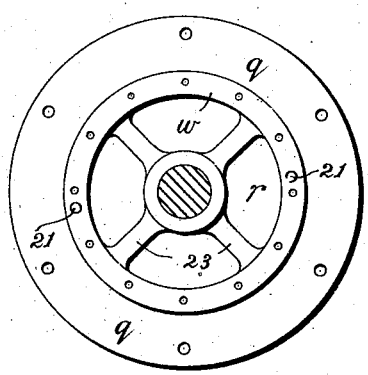
Fig. 4.
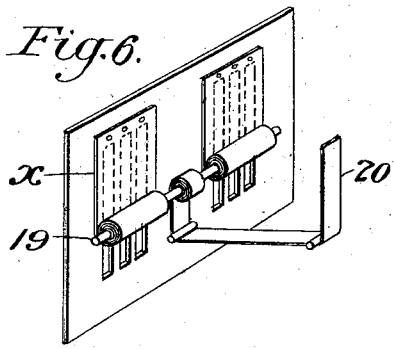
Fig. 6.
WITNESSES
Fred White
Thomas F. Wallac?
INVENTOR:
Herbert Davis,
By his Attorneys No. 726,263. PATENTED APR. 28, 1903.
H. DAVIS.
APPARATUS FOR DELIVERING AIR UNDER PRESSURE.
APPLICATION FILED APR. 8, 1902.
NO MODEL. 3 SHEETS—SHEET 3.

WITNESSES: Fred White, Thomas Wallace

INVENTOR: Herbert Davis,
By his Attorneys: Arthur E. Dresser & Co.

UNITED STATES PATENT OFFICE.

HERBERT DAVIS, OF WALTHAMSTOW, ENGLAND, ASSIGNOR TO HUGH SWANTON, OF LONDON, ENGLAND.

APPARATUS FOR DELIVERING AIR UNDER PRESSURE.

SPECIFICATION forming part of Letters Patent No. 726,263, dated April 28, 1903.

Application filed April 8, 1902. Serial No. 101,950. (No model.)

*To all whom it may concern:*

Be it known that I, HERBERT DAVIS, mechanic, of 44 Grosvenor Park road, Walthamstow, county of Essex, England, have invented certain new and useful Improvements in Bellows Apparatus for Delivering Air Under Pressure, of which the following is a specification.

This invention relates to bellows apparatus for delivering air under pressure. Considerable difficulty has hitherto been experienced in providing a rotary bellows apparatus which can be run at comparatively high speed owing to the valve area being determined and limited to small dimensions by the diameter of the trunk or hollow shaft through which the air was drawn and delivered.

The object of this invention is to provide a rotary bellows apparatus for delivering air under pressure, which apparatus shall be capable of speeds hitherto unattainable and which can be started without load and can be compounded in series to successively raise the air-pressure one stage in each apparatus and at the same time allow of the compressed air in each stage to be used independently, if required.

A rotary bellows apparatus made in accordance with my invention comprises a number of hinged feeders or bellows disposed around an intake-chamber carried upon a solid shaft, the weighted feeders being adapted to open by gravity toward the shaft and to take air from the intake-chamber and deliver the same to a chamber or channels disposed upon the circumference and communicating with another air-chamber also rotating upon the shaft, said air-chamber delivering the compressed air by exits disposed around the shaft to a fixed air-trunk, the joints between the rotary air-chamber and fixed trunk being kept air-tight by rings (one on each part) making a rubbing contact and kept in good contact by a flexible diaphragm or diaphragms subject to the pressure of the discharge. I also provide the usual valve in the fixed air-discharge trunk, adapted to be actuated by the rise and fall of the main air-reservoir, so as to create a back pressure in the discharge when the demand for wind ceases. Also according to my invention I provide an auxiliary choking-valve actuated by a small bellows or a diaphragm subject to the air-pressure of the discharge through a choked aperture, the gradual opening of the choking-valve allowing the pressure to rise gradually, so that the apparatus can be started without load, thereby rendering the apparatus especially applicable for use with constant-speed motors.

The accompanying drawings illustrate apparatus made in accordance with my invention.

Figure 1 is a sectional elevation of the improved apparatus. Fig. 2 is a section of Fig. 1 on line 1 2. Fig. 3 is an enlarged view of air-discharge trunk and air-tight connections to rotary blower. Fig. 4 is a face view of the annular flexible disks forming part of the air-tight joint. Fig. 5 is a diagrammatic view showing three apparatus compounded in series. Fig. 6 is a perspective view of a valve.

Referring now to the drawings, $a$ is a solid driving-shaft. $b$ is a square intake-chamber, mounted upon said shaft by means of wheel-like end disks $c$ and $d$. One wheel-like disk or end of the chamber $b$ is rendered open for the intake of air by apertures $e$. The other end of chamber is entirely closed by the disk $d$.

$ffff$ are feeders disposed around the intake-chamber $b$ and having lids $g$, which are weighted, as at $h$, so as to open by gravity toward the shaft $a$. By coupling the feeds as described both the weights on both opposite feeders come into operation at one time, so that each feeder may carry half the weight necessary for its operation. The lids of the opposite feeders are coupled by connecting-rods $g'$, and the extent to which they open and close is determined, if required, by stops, such as $g^2$. The fixed bases of the feeders are formed by the sides of the intake-chamber $b$.

$i$ represents the intake-valves of the feeders disposed in the lids, and $k$ represents the discharge-valves in the fixed parts.

$l$ represents channels into which the feeders discharge, and these channels are disposed longitudinally on the circumference of the intake-chamber $b$ and open into a compressed-air chamber $o$, disposed around the shaft. One side of this chamber $o$ is formed by the closed end $d$ of the intake-chamber, and the other side is formed by a disk $p$, supported upon the shaft by suitable wheel-like bearings $q$ and having air-exits $r$ formed around the shaft and bearings. Said exits $r$ open into a fixed air-trunk $s$, by which the air is conducted to the next bellows apparatus or to the main air-bellows of an organ or other destination for use.

Referring now more particularly to Fig. 3, which shows the parts enlarged, in order to maintain an efficient air-tight joint between the fixed air-trunk $s$ and rotary air-chamber $o$ I provide on the fixed air-trunk a flexible annular diaphragm $t$, fixed to the air-trunk at its outer edge, as at $u$, and carrying at its inner edge a turned-metal jointing-ring $v$, which makes a rubbing contact with a similar ring $w$, preferably formed as a flange on the wheel-like support $q$ of the rotary air-chamber $o$. The ring $v$ is in two parts, the diaphragm $t$ being clamped between them. It will be seen that the flexible diaphragm $t$ is subject to pressure of the compressed air discharged, which pressure serves to keep the rings $v$ and $w$ in good contact for making an efficient air-tight joint. In order to reduce friction, the width of the rings is reduced as much as possible consistent with efficiency of the air-tight joint. Similar contact-rings $v'$ $w'$ and flexible diaphragm $t'$ are provided on the outer wall of the air-trunks to insure an air-tight joint thereat where the shaft passes through the casing of the trunk. In order that the rings $v$ and $w$ and $v'$ and $w'$ may make a good air-tight joint when the apparatus first starts, they are kept pressed together by suitable springs, such as are shown at 20. The rings are also adapted to slide upon pins, as at 21, which pins serve to take the weight of the parts.

In the construction shown the rotary rings $w$ and $w'$ are carried at opposite ends of a sleeve 22, the ring $w$ being carried at the extremity of arms 23, the openings between which form the air-passage between the chamber $o$ and trunk $s$.

For the purpose of cushioning the bellows by back pressure at starting I provide a valve or slide of suitable construction, such as $x$, adapted to close the tube or trunk $y$, which leads to the next rotary bellows, organ, or other instrument. This valve is operated by the rise and fall of a small bellows $z$, which is weighted in the ordinary manner, so that its pressure slightly exceeds that of the next rotary bellows, organ, or other instrument. A large diaphragm or other equivalent may be substituted for the small bellows $z$. As the tape 20, Fig. 6, is pulled it turns the roller 19 and winds the valve or blind $x$ on the roller, so as to uncover the apertures behind the blind. The fixed casing or trunk $s$ is connected to the small bellows $z$ by a pipe or duct 1, which is fitted with an adjustable choking device. By this arrangement on starting the apparatus the delivery of compressed air from the rotary bellows is retarded by the valve $x$, which rises gradually as the bellows $z$ expands by the air-pressure passing through the choking-duct 1.

Describing now the operation of the apparatus in reference to Figs. 1 and 2 and assuming the apparatus to have just started, the air passes to the intake-chamber from one end by apertures $e$. On rotation of the apparatus the lids $g$ open and close as they pass around, taking in air from the chamber $b$ through valves $i$ and compressing and discharging said air through the valves $k$ into the circumferential chamber $b$ and thence by end chamber $o$ and exits $r$ to the air-discharge trunk $s$. At first, however, the valve $x$ is closed. The discharge and back pressure thus created prevent all the air from being expelled from the feeders, thus providing an elastic cushion for the weights and preventing shock to the apparatus. The air, however, gradually creeps through the choking-aperture 1 into the bellows $z$, and thereby gradually opens the choking-valve $x$ and increases the discharge, the compressed air passing by the air-pipe $y$ to the main air-reservoir 2 through the inlet-valve 3. As the reservoir 2 fills it serves through the usual connections to close the valve 3. As soon as this takes place back pressure is created in the air trunk and discharge and the feeders are kept open and inoperative to a more or less extent, according to the back pressure created, which is determined by the extent to which the valve 3 has closed.

In the improved construction described the bellows open or expand on rotation of the shaft by means of the gravity of the weights, and the compressed air is expelled by the weights, assisted by the centrifugal force due to rotation. This assistance of the centrifugal force, together with the much greater valve area obtainable, allows the apparatus to be run at speeds hitherto unattainable (by reason of having the inlet-valves on the circumference as compared with a hollow shaft construction) with a correspondingly-increased output. Also owing to the centrifugal force assisting the expulsion of the air the apparatus can be operated without the aid of the springs hitherto used.

By the improved construction it is also possible to combine the apparatus in series.

Fig. 5 of the accompanying drawings shows diagrammatically three of the improved rotary air-compressing apparatus 5, 6, and 7 compounded in series. The air delivered at, say, 20 pounds' pressure per square foot from the apparatus 5 passes by air-trunk 8 to the intake of the apparatus 6, entering the same by intake 9 at twenty pounds' pressure per square foot and being discharged into the trunk 10 at, say, forty pounds pressure per square foot. The air at this pressure then passes by intake 11 to apparatus 7 and is thereby passed and discharged into the air-trunk 12 at, say, eighty pounds' pressure per square foot.

Air-reservoirs 13 14 15 are respectively connected to the air-trunks 8, 10, and 12 and are weighted and arranged to store air at a pressure corresponding to pressure in the trunk with which they are connected, thus rendering available compressed air at three different pressures capable of independent use for different parts of an organ or as required.

The air-tight joint described secures an efficient connection between the rotary and fixed parts of the apparatus, and the choking-valves 16, 17, and 18 serve, as before, to allow the apparatus being started without load, gradually increasing the load by opening up first one reservoir and apparatus and then the next.

What I claim, and desire to secure by Letters Patent, is—

1. In apparatus for delivering air under pressure the combination of a rotary shaft, weighted feeders disposed around said shaft and opening toward same, an intake-chamber formed between the shaft and feeders, compressed-air-discharge chambers disposed circumferentially, an air-chamber disposed around the shaft and in communication with the discharge-chambers, discharge-orifices disposed in said air-chamber around the shaft, a fixed air-discharge trunk adjacent to said orifices, a flexible annular diaphragm subject to the pressure of the discharge, turned-metal jointing-rings, one on the flexible diaphragm and the other on the rotating air-chamber, all substantially as and for the purpose set forth.

2. The improved apparatus for delivering air under pressure comprising the combination of a rotary shaft, an open wheel-like disk, a closed disk, feeder-bellows opening by gravity toward said shaft and connecting said open and closed disks and inclosing an intake-chamber around the shaft, an open wheel-like disk mounted on the shaft beyond the closed disk and forming therewith an air-discharge chamber, circumferential chambers connecting said discharge-chambers to the feeders, a fixed air-trunk having an opening around the shaft, means for making an air-tight joint between the edges of said opening and the opening in the wheel-like disk forming the discharge-chamber, all substantially as set forth.

3. In apparatus for delivering air under pressure the combination of a rotary shaft, a rotary bellows apparatus on said shaft, discharge-orifices disposed around the shaft, an air-discharge trunk into which said orifices open, rings forming a rubbing-joint between the rotary drum and fixed trunk, a flexible annular diaphragm carrying one ring and being subject to the pressure of the discharge, substantially as and for the purpose set forth.

4. The improved apparatus for delivering air under pressure comprising the combination of a rotary shaft, a drum-like structure upon said shaft forming an intake-chamber having inlet-orifices at one end, a series of weighted bellows, feeders disposed around the inside of said drum and opening toward the shaft, a drum-like discharge-chamber disposed at the closed end of the intake-chamber, discharge-orifices disposed around the shaft in the end of said discharge-chamber, a fixed air-discharge trunk into which said orifices open, jointing-rings between the rotary drum and fixed trunk, jointing-rings between the fixed trunk and rotary shaft, flexible diaphragms subject to the pressure of the discharge and keeping said jointing-rings in close contact substantially as and for the purpose set forth.

5. In apparatus for delivering air under pressure the combination with a rotary bellows apparatus in which the feeders open and close by gravity of an air-discharge trunk, a choking-valve in said trunk, a means actuated gradually by the rise of pressure in the air-discharge so as to open said choking-valve and so creating a temporary back pressure and cushion for the weighted feeders thereby allowing the apparatus to start without load and without shock substantially as set forth.

6. The improved rotary apparatus for delivering air under pressure comprising the combination of a number of rotary drums having weighted feeder-bellows, an intake-chamber to said feeder-bellows disposed between same and the shaft, a circumferential chamber into which the feeder is discharged, an air-discharge orifice around the shaft, connecting-channels between said orifices and the discharge-chambers, an air-trunk between each two rotary drums and connecting the discharge-orifice of one drum with the intake of the next, a choking-valve in each connecting air-trunk, a device expanded by air-pressure in the discharge for actuating the choking-valve, an air-discharge trunk receiving the discharge from the last drum of the series, jointing-rings forming a rubbing-joint between the rotary drums and fixed trunk and jointing-rings between the fixed trunk and rotary shaft, flexible diaphragms subject to the pressure of the discharge and keeping said rings in close contact, air-reservoirs connected to each air-trunk beyond the choking-valve, valves for said reservoirs, means for opening and closing said valves by the rise and fall of the air-reservoir, all substantially as and for the purpose set forth.

7. In rotary apparatus for delivering air under pressure means for securing an air-tight joint between the rotary and fixed parts, comprising the combination of a transverse face on one part, an annular surface on the other part making a rubbing contact with said transverse face, springs for temporarily keeping said rubbing-surfaces in contact, a flexible diaphragm subject to the air-pressure for keeping the rubbing-surface in good contact to form an efficient air-tight joint when the apparatus is at work, all substantially as set forth.

8. In apparatus for delivering air under pressure the combination with intake and discharge chambers such as described of bellows-feeders rotatable about a central axis adapted to open and close by gravity and closing away from the center so that the discharge is accelerated by gravity due to the weights and the centrifugal force due to the rotation, substantially as set forth.

9. The improved bellows apparatus for delivering air under pressure, comprising in combination a number of bellows mechanisms, an air-trunk between each two mechanisms and connecting the discharge of one with the intake of the next, a choking-valve in each connecting air-trunk, and a device operated by air-pressure in the discharge for actuating the choking-valve.

10. In rotary apparatus for delivering air under pressure, means for securing an air-tight joint between the rotary and fixed parts comprising the combination of a transverse face on one part, an annular face on the other part making a rubbing contact with said transverse face, and a flexible diaphragm subject to the air-pressure for keeping the rubbing-surfaces in good contact to form an efficient air-tight joint when the apparatus is at work.

In witness whereof I have hereunto signed my name in the presence of two subscribing witnesses.

HERBERT DAVIS.

Witnesses:
HENRY ALLEN PRYER,
ALFRED B. CAMPBELL.